3,064,670
PRESSURE REDUCING DEVICES
Lucien Péras, Billancourt, France, assignor to Regie Nationale des Usines Renault, Billancourt, France
Filed Jan. 7, 1960, Ser. No. 1,092
Claims priority, application France Jan. 13, 1959
4 Claims. (Cl. 137—116.5)

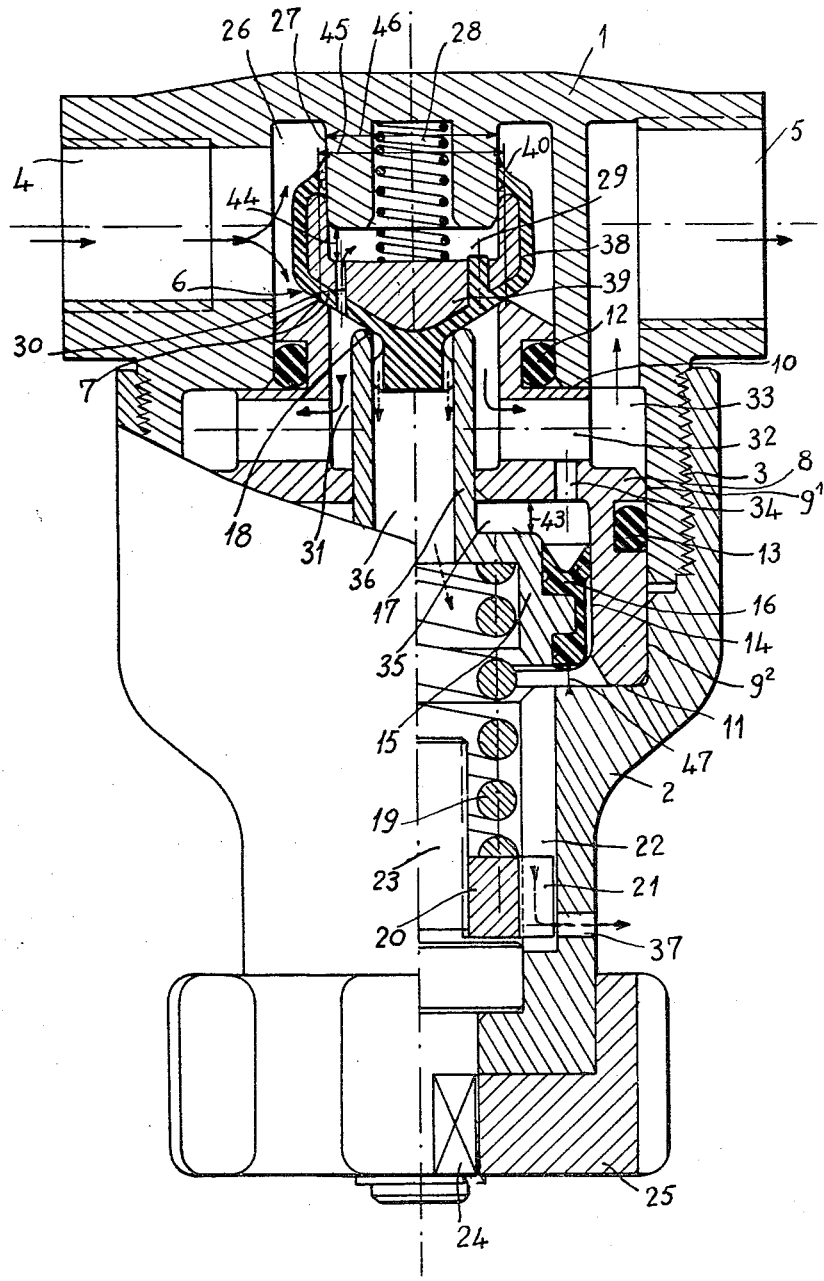

The present invention relates to pressure reducing devices and has specific reference to an improved pressure reducer intended more particularly for compressed-air systems.

The pressure reducing device or valve of this invention is characterized not only by a great sturdiness and reliability, and by relatively moderate over-all dimensions resulting from the use of a regulator piston instead of the conventional diaphragm, but also by a high sensitivity in its operation, while utilizing only a single valve member adapted when unseated to open a relatively large passage area.

This sensitivity, which is attended quite advantageously by the use of a relatively weak regulating spring, is obtained by providing in the pressure inlet space of the device a distributor valve in the form of a cap slidably mounted on a guide member registering with the valve seat, whereby the force necessary for seating this valve, which is due to the feed pressure, can be reduced accordingly.

Moreover, the space available between this cap-shaped valve and its guide is advantageously connected to the expanded pressure space of the device, a relatively weak spring urging said valve against its seat and for engagement with the aforesaid regulator piston subjected in turn to an antagonistic spring the pressure of which may be adjusted as a function of the desired expanded pressure.

According to this invention, this sensitivity may be complemented quite easily by a safety against any untimely increase in the expanded adjustment pressure by providing for said valve another seat disposed internally of the first one and consisting of the rod controlling the regulator piston which is constantly connected to the atmosphere. Thus, an abnormal increase in the expanded pressure will firstly allow the valve to close its first distributor seat, if it is not already engaged thereon, and in any case this abnormal pressure increase will cause the expanded pressure space of the device to be vented to the atmosphere through the second seat either until this pressure has resumed its preset or adjustment value, or until the cause of this undue pressure increase has been ascertained and eliminated.

Although a similar result can be obtained by inserting a safety valve in the outlet pipe of the device, it will be readily understood by those conversant with the art that this result is obtained with this arrangement at a lesser cost and, what is more important per se, that this safety feature is attended by an automatic and accurate adjustment depending only and strictly on the adjustment of the pressure reducing device proper.

A preferred form of embodiment of the pressure reducing device of this invention will now be described with reference to the accompanying drawing the single figure of which illustrates in fragmentary axial section of the device.

In this figure, the body of the pressure reducer consists of two sections, an upper section 1 and a lower section 2, assembled by screwing as at 3.

The upper section 1 comprises an inlet pipe 4 and an outlet pipe 5 for the compressed air, the fluid passage therebetween being controlled by a valve 6 the seat 7 of which consists of the upper frustoconical edge of a member 8 slidably fitted in the bores $9^1$, $9^2$ of sections 1, 2 and kept in position between the respective shoulders 10, 11 of these sections. Toroidal gaskets 12 and 13 are fitted in adequate grooves of this member 8 to ensure its peripheral fluid-tightness in the body.

Moreover, this member 8 is formed at its lower portion with a bore 14 in which a regulator piston 15 formed with a lipped packing 16 is slidably fitted. This piston comprises an upper, hollow, rod-like extension 17 forming a second seat 18 for the valve 6, this rod being normally urged to its position of engagement with the valve 6 by a regulator spring 18 bearing with its opposite end against the piston 15, as shown.

The pressure of spring 19 is adjustable and to this end it engages a nut 20 which, on the one hand, is axially guided in the body section 2 by radial splines, wings or like projections 21 slidably fitted in corresponding grooves 22 formed in this section, and, on the other hand, receives in its centre a rod 23 having an extension 24 preferably of polygonal section which projects from the body of the device and has secured thereon an adjustment handwheel 25.

In addition, the valve located in the air inlet space 26 of the pressure reducing device has the general shape of a cap slidably mounted on a cylindrical guide member 27 consisting of an inner projection formed integrally with the upper section 1 of the body and registering with the valve seats.

A relatively weak spring 28 urges this valve against its seats 7 and 18, and the space 29 between the guide 27 and valve 6 is connected to the expanded pressure space of the device through the medium of a passage 30 of relatively small cross-sectional area which opens into the interval between the aforesaid valve seats. This expanded pressure space consists firstly of the annular chamber 31 formed between the rod 17 and member 8, the latter being formed between the gaskets 12 and 13 with radial orifices 32 opening into an annular chamber 33 communicating with the outlet pipe 5 of the device. This expanded pressure space comprises on the other hand, due to the provision of a passage 34, the chamber 35 formed in the member 8 above the regulator piston 15.

It will be noted that the space 36 formed beneath the valve 6 in the hollow rod 17 of piston 15 and under this piston is constantly connected to the atmosphere through the orifice 37 formed through the wall of the lower end of the lower section 2 of the body.

According to a preferred form of embodiment of the device, the cap-shaped valve 6 consists of a cup-forming portion 38 of flexible, resilient material fitting around an armature 39 adapted to impart a sufficient rigidity to the valve and permit its proper movement relative to the guide 27 during the operation of the device. Moreover the cap 38 fits around the armature 39 completely and comprises an inner lip 40 engaging the guide member 27 and acting as a sliding contact packing.

This cap also comprises, at its end opposite the lip 40, a substantially cylindrical extension 41 constituting a complementary guiding portion slidably engaged in the hollow rod 17, this projection being formed with guiding splines 42 in order not to obturate the passage formed by the inner cavity of this rod under the seat 18.

Firstly, when this device is in its inoperative condition, that is, with the compressed-air inlet closed and expanded pressure at zero value (that is, the atmospheric pressure), the regulator spring 19, acting through the medium of piston 15 and rod 17, will lift the valve 6 in order to uncover the distributor orifice corresponding to its seat 7. This lifting movement is made possible by the permissible stroke 43 of piston 15 within the member 8, and also by the permissible stroke 44 of the valve with respect to its guide 27. In this raised position the valve remains properly seated on its secondary seat 18 due to the antagonistic action of springs 19 and 28. Now it will be noted that during the whole of the period of normal operation of the device as set forth hereafter, the valve will actually be urged against its seat 18 as if it were effectively solid with the rod 17.

When compressed air is fed through the inlet pipe 4, this air flows through the passage area available between the valve and its seat 7, then through chamber 31 to the outlet pipe 5 along the path already set forth (see the arrows in thick lines), and finally into the chamber 35.

The air flowing into chamber 31 will firstly apply an expanded pressure to the valve 6, the application area being the surface of seat 7 minus that of seat 18. However, as the narrow passage 30 directs expanded air to the reduced capacity 29 now remaining within the valve cap and as this air is now acting therein over a surface approximating that of seat 7, the valve will still be urged downwards for engagement with the rod 17 not only by the spring 28 but also by a thrust resulting from the expanded pressure exerted over an area substantially equal to that of seat 18.

As the expanded air in chamber 31 will also penetrate into the reduced capacity 35 still available above the regulator piston 15, the latter will be urged downward so as to compress the spring 19.

Therefore, the expanded pressure acting upon the valve 6 and piston 15 against the antagonistic force of spring 19 will tend to close the passage of valve 6.

Under these conditions, it will be readily understood that for a given pre-adjustment of the tension of spring 19 which will balance the action exerted by the expanded pressure, this pressure will subsequently be maintained at a predetermined value.

In this respect it will be noted that the sensitivity of the device of this invention is particularly high due to the state of nearly perfect balance in which the valve 6 is maintained.

As a matter of fact, during the operation of the device, the force likely to urge the valve on its seat 7 is that exerted by the inlet air against the differential area corresponding to the diameters 45 and 46, with due account for the fact that the valve and the regulator piston behave as if they formed an integral unit.

Now it will be seen that these diameters are very close to each other. This is an important feature for a large-output devices can be constructed while preserving a predetermined, well-defined sensitivity.

Furthermore, during the operation of the device the packing 16 of regulator piston 15 acts a moderator adapted, by its frictional engagement with the bore 14, to avoid sudden movements of the piston and any valve impact.

On the other hand, if during the operation of the device and for any reason the expanded pressure became higher than the adjustment pressure, the piston 15, which is in relative equilibrium between the action of spring 19 and that of the expanded pressure, will be moved downwards. During this movement, the rod 17 rigid with the piston 15 will also move downwards so as to uncover the orifice corresponding to the secondary seat 18 within the limits corresponding to the permissible stroke of piston 15 which is shown at 47. Thus, the expanded pressure space will be vented immediately to the atmosphere through the orifice 37 (see dotted arrows) and this exhaust condition will continue as long as an excess pressure prevails on the outlet side of the device.

Of course, this type of safety valve incorporated in the pressure reducing device and adjusted automatically thereby constitutes a particularly useful feature.

I claim:
1. Pressure reducing device comprising a body having an inlet chamber and an outlet chamber, a valve seat provided between said two chmabers, a valve cooperating with said seat, guide means for said valve provided in said inlet chamber, said valve and said guide means defining a space, said valve having a passage establishing communication between said space and said outlet chamber inside of said valve seat, means responsive to the pressure of said outlet chamber defining a portion of said chamber inside of said body and including a hollow rod having one extremity cooperating with said valve, adjustable flexible means acting upon said pressure responsive means and urging said rod against said valve, said rod having a tubular passage in communication with the atmosphere and forming with its extremity a second seat for the valve inside of said first seat, said guide means for the valve having a cross-sectional area at most equal to that of said first seat and greater than that of the space between said first valve seat and said second valve seat, said valve including an armature having a cover of flexible material and said cover having an edge forming a tight joint with the guide means and adapted to slide thereon.

2. A pressure reducing device as claimed in claim 1, wherein said armature and cover surround the guide means.

3. A pressure reducing device as claimed in claim 1 wherein said flexible cover is extended by a nipple sliding in the rod.

4. Pressure reducing device comprising a body having an inlet chamber and an outlet chamber, a valve seat provided between said two chambers, a valve cooperating with said seat, guide means for said valve provided in said inlet chamber, said valve and said guide means defining a space, said valve having a passage establishing communication between said space and said outlet chamber inside of said valve seat, means responsive to the pressure of said outlet chamber defining a portion of said chamber inside of said body and including a hollow rod having one extremity cooperating with said valve, adjustable flexible means acting upon said pressure responsive means and urging said rod against said valve, said rod having a tubular passage in communication with the atmosphere and forming with its extremity a second seat for the valve inside of said first seat, said guide means for the valve having a cross-sectional area at most equal to that of said first seat and greater than that of the space between said first valve seat and said second valve seat, said pressure responsive means including a piston and said adjustable flexible means including a spring and said valve including an armature having a cover of flexible material and said cover having an edge forming a tight joint with the guide means and adapted to slide thereon.

References Cited in the file of this patent
UNITED STATES PATENTS

| | | |
|---|---|---|
| 2,154,901 | Hulse et al. | Apr. 18, 1939 |
| 2,707,966 | Taplin | May 10, 1955 |
| 2,730,326 | Staben | Jan. 10, 1956 |
| 2,777,458 | Stern | Jan. 15, 1957 |
| 2,806,481 | Faust | Sept. 17, 1957 |
| 2,888,027 | Gerwig et al | May 26, 1959 |
| 2,910,998 | Davis | Nov. 3, 1959 |
| 2,981,280 | Cornelius | Apr. 25, 1961 |
| 2,985,490 | Gates | May 23, 1961 |

FOREIGN PATENTS

| | | |
|---|---|---|
| 291,403 | Switzerland | Sept. 16, 1953 |